United States Patent
Saeed et al.

(10) Patent No.: US 7,343,171 B2
(45) Date of Patent: Mar. 11, 2008

(54) METHOD AND SYSTEM FOR INTERRUPTING A DISPATCH CALL

(75) Inventors: Faisal Saeed, Sunrise, FL (US); Deepak P. Ahya, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 189 days.

(21) Appl. No.: 10/843,077

(22) Filed: May 11, 2004

(65) Prior Publication Data

US 2005/0255871 A1 Nov. 17, 2005

(51) Int. Cl.
*H04B 7/00* (2006.01)
*H04Q 7/20* (2006.01)

(52) U.S. Cl. .................. 455/518; 455/90.2; 455/78; 455/69; 455/88; 455/426.1; 455/450; 455/457; 455/464; 455/509; 455/516; 455/520; 455/455; 370/201

(58) Field of Classification Search ............... 455/518, 455/69, 78, 88, 426.1, 414.1, 447, 520, 450, 455/90.2, 457, 458, 464, 507, 509, 516, 455; 370/201, 441

See application file for complete search history.

(56) References Cited

U.S. PATENT DOCUMENTS

| | | | | |
|---|---|---|---|---|
| 5,483,670 | A * | 1/1996 | Childress et al. | 455/515 |
| 5,881,370 | A * | 3/1999 | Pottala et al. | 455/78 |
| 5,983,099 | A * | 11/1999 | Yao et al. | 455/426.1 |
| 6,628,763 | B1 * | 9/2003 | Mani | 379/93.35 |
| 6,628,768 | B1 | 9/2003 | Ramaswamy et al. | |
| 6,895,011 | B1 * | 5/2005 | Lassers | 370/394 |
| 6,928,294 | B2 * | 8/2005 | Maggenti et al. | 455/518 |
| 6,963,543 | B2 * | 11/2005 | Diep et al. | 370/261 |
| 7,035,657 | B2 * | 4/2006 | Chen et al. | 455/518 |
| 2005/0032475 | A1 * | 2/2005 | Mauney et al. | 455/41.2 |
| 2005/0070320 | A1 * | 3/2005 | Dent | 455/516 |

OTHER PUBLICATIONS

U.S. Appl. No. 10/631,234, Patel et al, not yet published.
U.S. Appl. No. 10/659,993, Sharo, not yet published.

* cited by examiner

*Primary Examiner*—Matthew Anderson
*Assistant Examiner*—Shaima Q. Aminzay
(74) *Attorney, Agent, or Firm*—Larry G. Brown

(57) ABSTRACT

The invention concerns a method (300) and system (100) for interrupting a dispatch call. The method can be practiced in a dispatch communications system (100) having at least a first communications channel (162) for carrying voice traffic and a second communications channel (164) for carrying communications-enabling information. The method includes the steps of assigning (312) the first communications channel to at least a first caller (133) and a second caller (135) to permit the first and second callers to engage in a dispatch call and as the first caller has control over the first communications channel, transmitting (314) an interrupt message (505) over the second communications channel to inform the first caller of an interrupt status of the second caller. The transmitting step is performed without terminating the dispatch call.

12 Claims, 5 Drawing Sheets

METHOD AND SYSTEM FOR INTERRUPTING A DISPATCH CALL

BACKGROUND OF THE INVENTION

1. Field of the Invention

This invention relates in general to communications between mobile units and more particularly to dispatch communications between such units.

2. Description of the Related Art

In today's marketplace, consumers have the option of purchasing mobile units that permit duplex communications (interconnect), simplex communications (dispatch) or even a combination of the two. When conducting a duplex-based call, two callers may freely interrupt one another because a separate channel is assigned to each caller. During a dispatch call, however, a single communications channel is reserved for the conversation, which means that a single caller is assigned the channel as he or she is talking, or at least as long as the single caller has activated the mechanism for accessing the channel (e.g., a push-to-talk button). During this time, the non-speaking caller must wait to talk until the speaking caller releases the channel. As a result, it may take a significant amount of time before the caller who does not have control of the channel is permitted to speak or otherwise relay information to the caller who has control over the channel.

In prior art dispatch systems, an abort feature has been implemented into some mobile units to help solve the problem. Specifically, a caller who does not have control over the channel can press an abort button to give that caller a chance to speak. Unfortunately, the call is terminated when this abort feature is activated, and a new call must be set up to permit the parties to reinitiate their conversation. Aborting a call in this manner may be considered rude, and it may be difficult to reestablish the call if resources are limited. It also takes additional time to set up the call.

SUMMARY OF THE INVENTION

The present invention concerns a method for interrupting a dispatch call in a dispatch communications system having at least a first communications channel for carrying voice traffic and a second communications channel for carrying communications-enabling information. The method includes the steps of assigning the first communications channel to at least a first caller and a second caller to permit the first and second callers to engage in a dispatch call and as the first caller has control over the first communications channel, transmitting an interrupt message over the second communications channel to inform the first caller of an interrupt status of the second caller. The transmitting step is performed without terminating the dispatch call.

The method can further include the step of informing the first caller of the interrupt message through a user interface. As an example, the user interface can be a message on a display and/or an audible tone. In one arrangement, the interrupt status of the second caller can be at least one of the following: an indication that the second caller desires to have control over the first communications channel; the second caller desires to have the first caller call the second caller at a later time; the second caller cannot currently speak; and the second caller is in a meeting.

In another arrangement, the first communications channel can be a traffic channel, and the second communications channel can be a primary control channel having at least one of a random access channel and a common control channel.

The method can also include the step of acknowledging the step of transmitting the interrupt message.

The present invention also concerns a mobile unit for interrupting a dispatch call. The mobile unit can include a transceiver for use in a dispatch communications system having at least a first communication channel for carrying voice traffic and a second communications channel for carrying communications enabling information. The first communications channel is assigned to at least a first caller and a second caller to permit the first and second caller to engage in a dispatch call.

The mobile unit can also include a processor. As the first caller has control over the first communications channel, the processor is programmed to generate an interrupt message and to cause the transceiver to transmit the interrupt message over the second communications channel to inform the first caller of an interrupt status of the second caller without the dispatch call being terminated. The mobile unit also includes suitable software and circuitry to carry out the processes described above.

The present invention also concerns a communications network for interrupting a dispatch call. The communications network can include a site for use in at least a dispatch communications system in which the site has at least one base station for transmitting and receiving voice traffic over a first communications channel and for transmitting and receiving communications-enabling information over a second communications channel.

The communications network also includes a communications processor. The communications processor is programmed to assign the first communications channel to at least a first caller and a second caller to permit the first and second callers to engage in a dispatch call. As the first caller has control over the first communications channel, the communication processor is further programmed to generate an interrupt message and to cause the base station to transmit the interrupt message over the second communications channel to inform the first caller of an interrupt status of the second caller. The interrupt message is transmitted without terminating the dispatch call. The communications network can also include suitable software and circuitry for carrying out the processes described above.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
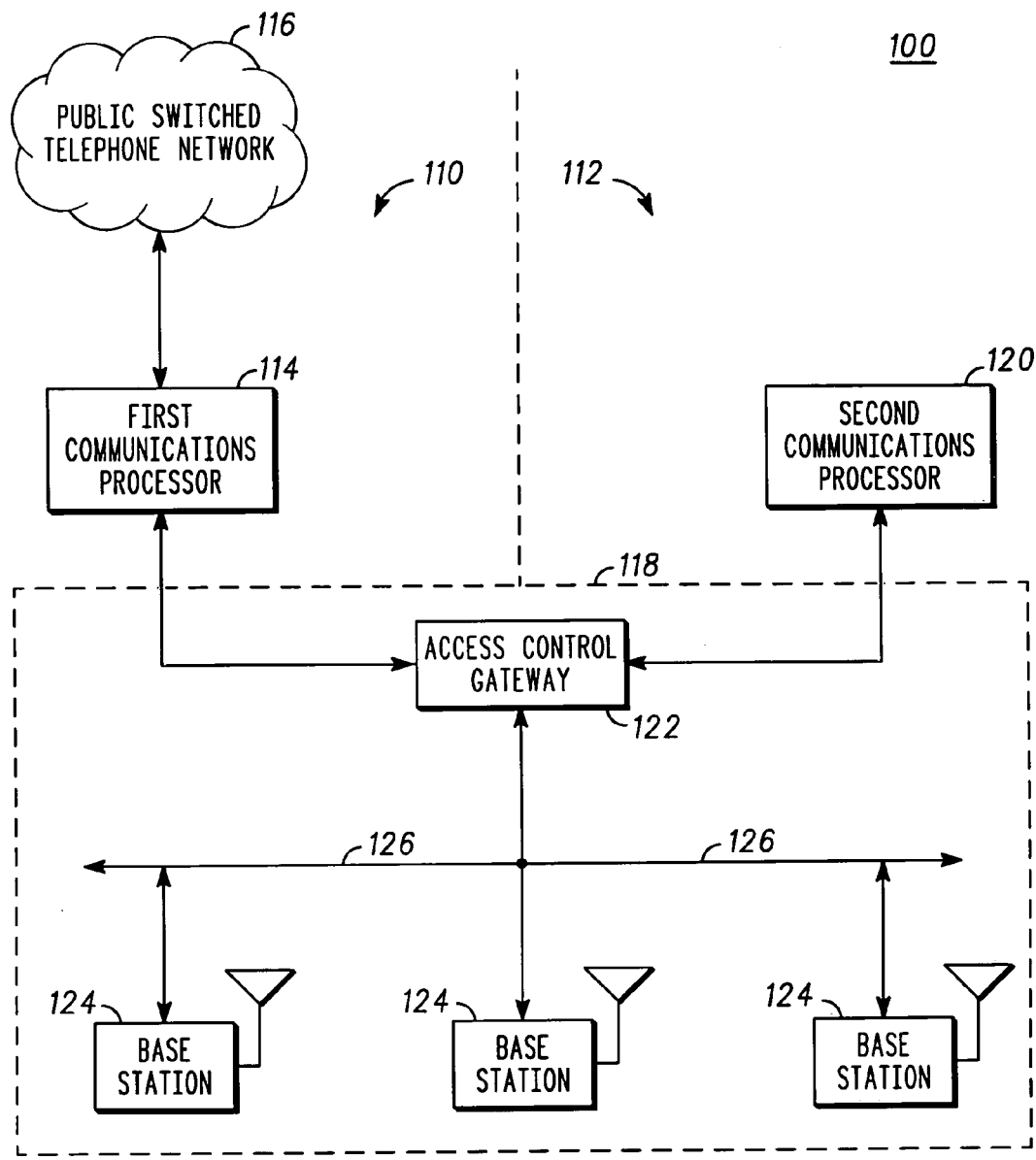
FIG. 1 illustrates a system for interrupting a dispatch call in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention concerns a method for interrupting a dispatch call. As an example, if a first caller and a second caller are engaged in a dispatch call, the first caller may have control of the channel over which the first and second callers are communicating. The second caller may wish to interrupt the first caller to enable the second caller to speak to the first caller. To do so, the second caller must gain control over the communications channel.

In one arrangement, the second caller can activate a feature on his mobile unit, which will then generate an interrupt message. The interrupt message can be transmitted to the communications network facilitating the dispatch call between the first and second callers. In response, the network can transmit the interrupt message to the first caller, who can be informed through his mobile unit that the second caller wishes to interrupt the first caller. The first caller can then release the communications channel, and the second caller may be permitted to speak. This process can be accomplished without the dispatch call being terminated or torn down. Examples of systems and methods for carrying out the above description will be presented below.

Referring to FIG. 1, a system 100 for interrupting a dispatch call is shown. As an example and without limitation, the system 100 can include both a cellular telephone services portion 110 for supporting cellular telephone services and a trunked dispatch services portion 112 for supporting trunked dispatch services. Of course, it is understood that the invention can be practiced in a dispatch-only communications system. In fact, the invention can be practiced in any system that supports at least dispatch communications.

To support the cellular telephone services, the cellular telephone services portion 110 can include a first communications processor 114, which can be coupled to the public switched telephone network (PSTN) 116 and at least one site 118. The site 118 can include infrastructure that supports wireless communications.

To support the dispatch services, the dispatch services portion 112 can include a second communications processor 120, which can also be coupled to the site 118. As such, both the first communications processor 114 and the second communications processor 120 can share the infrastructure of the site 118 for processing both the cellular telephone and dispatch services. Although such a shared configuration is efficient, it is not necessary for the operation of either of these services. In addition, it is understood that the cellular telephone services portion 110 and the trunked dispatch services portion 112 can be coupled to sites other than or in addition to site 118.

In one arrangement, the site 118 can include one or more access control gateways 122, one or more base stations 124 and one or more buses 126 for coupling the base stations 124 to the access control gateway 122. The base stations 124 can communicate with, for example, a first mobile unit 128 over a wireless communications link 132 and with, as another example, a second mobile unit 130 over another wireless communications link 134. Continuing with the example, a first caller 133 may operate the first mobile unit 128, and a second caller 135 may operate the second mobile unit 130.

Of course, the invention is not limited to this particular example, as the invention contemplates any suitable number of callers or users using any suitable number of mobile units. Moreover, either of the first mobile unit 128 or the second mobile unit 130, depending on their location, may be serviced by another site. As an example, the first mobile unit 128 and the second mobile unit 130 may support both cellular telephone service and dispatch service, although the first mobile unit 128 and the second mobile unit 130 are not limited in this regard. In fact, the term mobile unit can include any telecommunications device suitable for conducting at least a dispatch call, including even a fixed telecommunications device.

The access control gateway 122 can include a computational platform having computational capacity and storage sufficient to support the functions described below. In addition, the link between the access control gateway 122 and the first communications processor 114 can be any high-level data link, as defined by the International Standards Organization. In one arrangement, the link between the access control gateway 122 and the second communications processor 120 can be a frame relay link. It is understood, however, that the invention is not limited in this regard, as any other suitable link can be used between the access control gateway 122 and the first communications processor 114 and second communications processor 120.

The base stations 124 can include radio transceivers configured to receive and transmit on appropriate frequencies using suitable modulation and air interface protocols for supporting the requirements of the services being provided. In another arrangement, the bus 126 that couples the base stations 124 to the access control gateway 122 can be an Ethernet link, as is well understood in the art.

The operation and configuration of the cellular telephone services portion 110 is well known, and an in-depth discussion is not warranted. Briefly, however, the first communications processor 114 can include a mobile switching center (not shown), a telephone database (not shown) and a base site controller (not shown). As appreciated by those of skill in the art, the mobile switching center can interface with the PSTN 116 and the base site controller. The mobile switching center can also control the provision of cellular telephone service to, for example, the first mobile unit 128 and the second mobile unit 130, if the first mobile unit 128 and the second mobile unit 130 support such a service. The telephone database can be coupled to the mobile switching center and can provide to the mobile switching center information concerning the operation of communications devices, such as the first mobile unit 128 and the second mobile unit 130.

Figure 2:
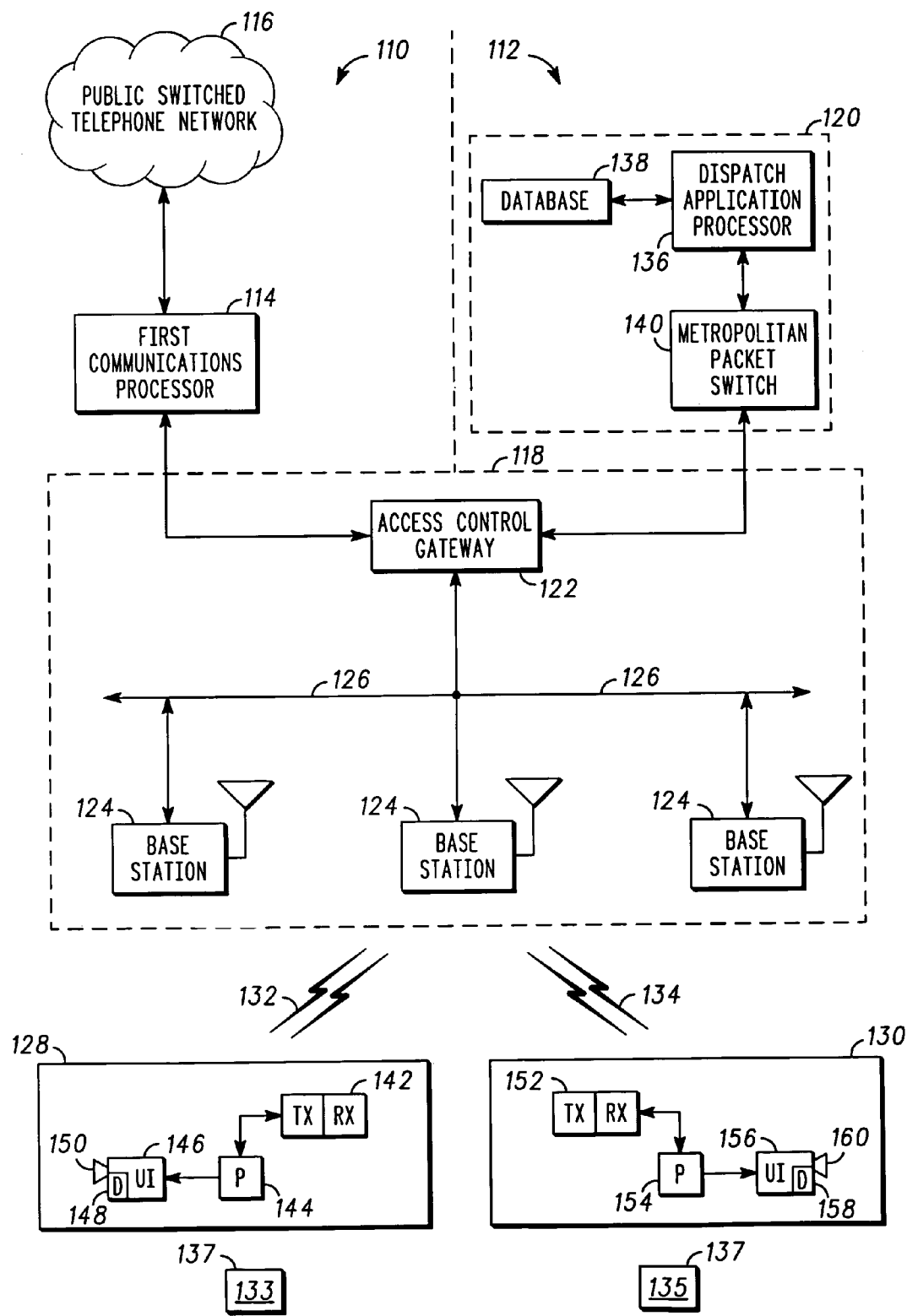
FIG. 2 illustrates the system of FIG. 1 in greater detail in accordance with an embodiment of the inventive arrangements.

Referring to FIG. 2, the second communications processor 120 can include an application processor such as a dispatch application processor 136, a database 138 coupled to the dispatch application processor 136 and a metropolitan packet switch 140, which can also be coupled to the dispatch application processor 136. Further, the dispatch application processor 136 can be coupled to the access control gateway 122 through the metropolitan packet switch 140. The dispatch application processor 136 can also be referred to as a communications processor.

As those of ordinary skill in the art will appreciate, the metropolitan packet switch 140 can route signals between sites to facilitate the inclusion of callers (including the first caller 133 and the second caller 135) that are located in other sites that the trunked dispatch services portion 112 serves. The database 138 can include information that relates to the operability status of, for example, the first mobile unit 128 and the second mobile unit 130, although the database 138 can include information relating to the operability status of any suitable number of mobile units. As an example and without limitation, the information stored by the database 138 can include individual identification, group identification, alias information, roaming status and priority information.

In one arrangement, the dispatch application processor 136 can be programmed to allocate communication resources among dispatch service users. For example, the dispatch application processor 136 can assign a dispatch communications channel that can carry voice traffic to the first caller 133 and the second caller 135 to enable them to engage in a dispatch call. In accordance with an embodiment of the inventive arrangements, the dispatch application processor 136 can receive an interrupt message from, for example, the second mobile unit 130 of the second caller 135. In response, the dispatch application processor 136 can extract information for the interrupt message and can generate or reconstruct an interrupt message. The dispatch application processor 136 can then cause an appropriate base station 124 to transmit the interrupt message over the wireless communications link 132 to the mobile unit 128 of the first caller 133.

The first mobile unit 128 can include a transceiver 142, a processor 144 and a user interface 146. As an example, the user interface 146 can include a display 148 for displaying images and a speaker 150 for broadcasting audio. Similarly, the second mobile unit 130 can include a transceiver 152, a processor 154 and a user interface 156, which can have a display 158 and a speaker 160. The processors 144 and 154 can be used to generate interrupt messages, which the respective transceivers 142,152 can transmit to the site 118. The transceivers 142, 152 can also receive interrupt messages from the site 118, and the first caller 133 and the second caller 135 can be informed of these interrupt messages through the respective user interfaces 146, 156. As an example, the interrupt message can be displayed on the displays 148, 158 and/or an audible notice can be broadcast over the speakers 150, 160.

Figure 3:
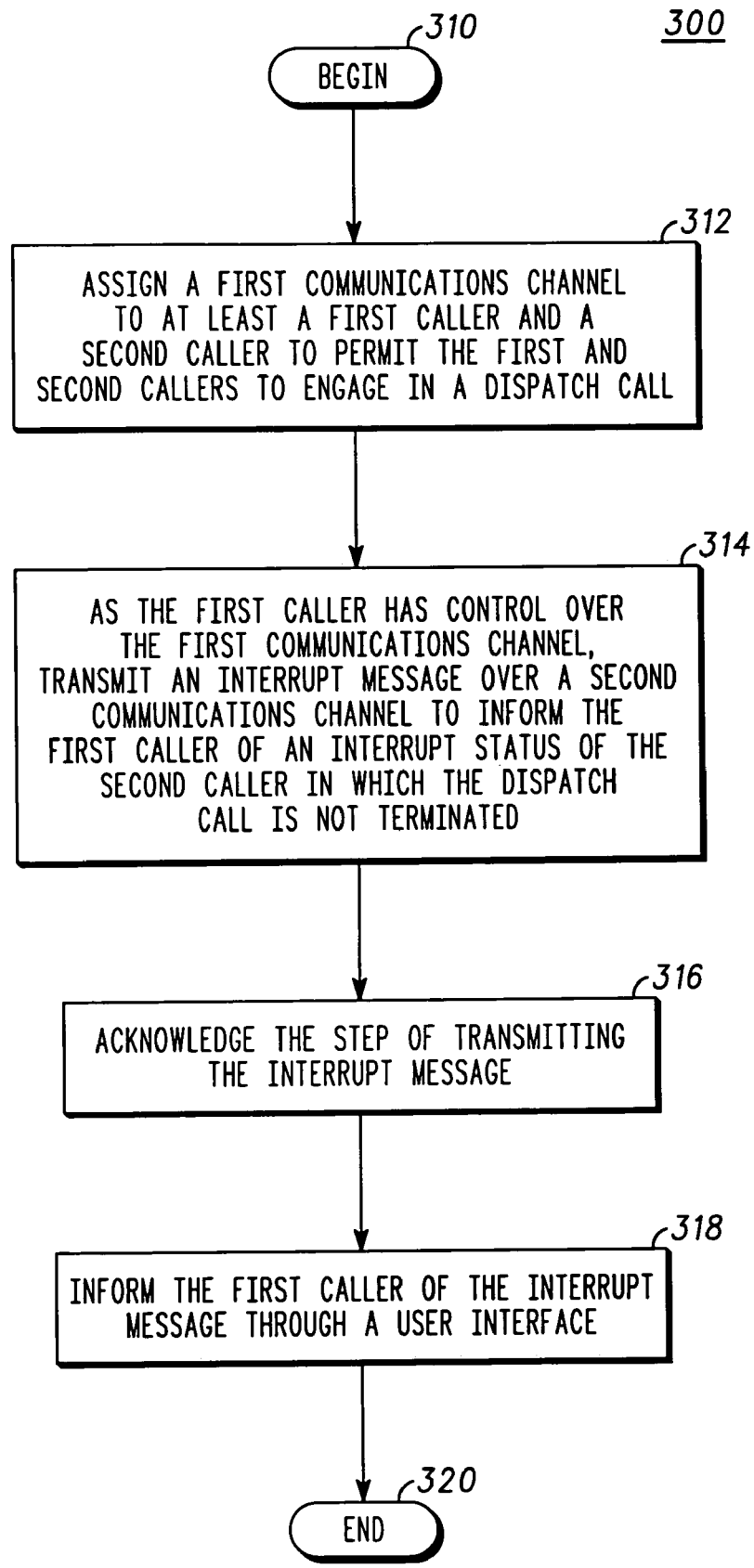
FIG. 3 illustrates a method of interrupting a dispatch call in accordance with an embodiment of the inventive arrangements.
Figure 4:
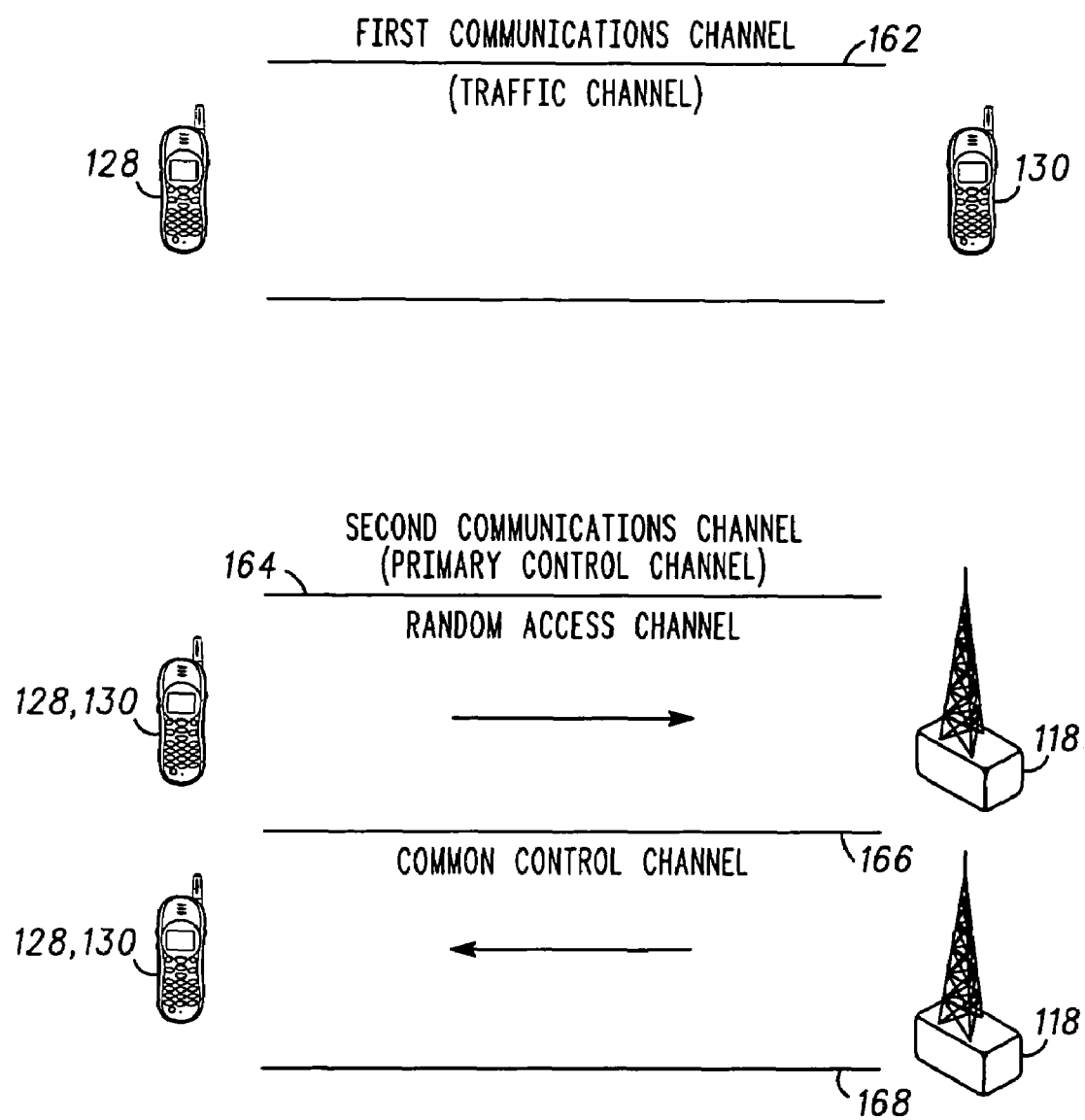
FIG. 4 illustrates several communications channels in accordance with an embodiment of the inventive arrangements.

Referring to FIG. 3, a method 300 for interrupting a dispatch call is shown. Reference will be made to FIG. 2, FIG. 4, which shows several sets of communications channels, and FIG. 5, which shows a portion of a data packet, when describing the steps of the method 300 of FIG. 3. It is understood, however, that the method 300 is in no way limited to being practiced in the system 100 of FIG. 2 and is not limited to the communications channels or the data packet illustrated in FIGS. 4 and 5, respectively. In fact, the method 300 can be implemented into any other suitable telecommunications system using any suitable communications channels and any suitable communications protocols.

At step 310 of FIG. 3, the method 300 can begin. At step 312, a first communications channel can be assigned to at least a first caller and a second caller to permit the first and second callers to engage in a dispatch call. This step can occur in a dispatch communication system having a first communications channel for carrying voice traffic and a second communications channel for carrying communications-enabling information.

For example, referring to FIGS. 2 and 4, the first caller 133, who may wish to engage in a dispatch call with the second caller 135, can initiate a dispatch call through the first mobile unit 128. The base station 124 can receive the request and can route it to the dispatch application processor 136 through the access control gateway 122 and the metropolitan packet switch 140. As is known in the art, the dispatch application processor 136 can access the relevant information about the second caller 135 from the database 138 and can locate the second mobile unit 130 of the second caller 135. The dispatch application processor 136 can then establish a connection between the first mobile unit 128 and the second mobile unit 130 and, referring to FIG. 4, can assign a first communications channel 162 to the first caller 133 and the second caller 135.

As noted above, the first communications channel 162 can be a channel for carrying voice traffic, and may be referred to as a traffic channel. It must be noted, however, that the first communications channel 162 can carry virtually any type of communications traffic, so long as it can support dispatch communications. The first communications channel 162 can facilitate communications between the first mobile unit 128 and the second mobile unit 130 through the system 100 (see FIG. 2).

Referring back to the method 300 of FIG. 3, at step 314, as the first caller has control over the first communications channel, an interrupt message can be transmitted over a second communications channel to inform the first caller of an interrupt status of the second caller without terminating the dispatch call. Specifically, as noted above, only one caller is permitted to have control over a dispatch channel at a particular point in time. As an example, referring again to FIGS. 2 and 4, the first caller 133 may activate a feature on the first mobile unit 128, such as a push-to-talk button (PTT), that grants him access to the first communications channel 162. The first caller 133 may begin speaking to the second caller 135.

The second caller 135, however, may wish to gain access to the first communications channel 162 while the first caller 133 has the first communications channel 162 tied up. The second caller 135 can activate a feature on the second mobile unit 130, which can cause the mobile unit 130 to generate an interrupt message. The interrupt feature can be activated through any suitable user interface, including but not limited to a programmable key on a keypad, a button on a mobile unit or a voice-activated command.

When the interrupt feature is activated, the processor 154 of the second mobile unit 130 can generate an interrupt message and can instruct the transceiver 152 to transmit the interrupt message to the site 118 over a second communications channel 164. In one arrangement, the second communications channel 164 can be a channel that carries communications-enabling information. Communications-enabling information can be any information that is used to facilitate communications between two or more mobile units, such as channel assignments, location requests, mobile unit identification, etc. As an example, the second communications channel 164 can be referred to as a primary control channel (PCCH). In addition, the first communications channel 162 and the second communications channel 164 can be part of the wireless communications links 132, 134.

In one arrangement, the second communications channel 164 can include a random access channel (RACH) 166 and a common control channel (CCCH) 168. It is understood, however, that the invention is not so limited, as the second communications channel 164 can have any suitable type of arrangement for transmitting communications-enabling information. In any event, the RACH 166 can be used to transmit communications-enabling information from the first mobile unit 128 (or the second mobile unit 130) and the site 118. Additionally, the CCCH 168 can be used to transmit communications-enabling information from the site 118 to the first mobile unit 128 (or the second mobile unit 130). In particular, the first mobile unit 128 can transmit the interrupt message to the site 118 over the RACH 166.

The interrupt message can be eventually forwarded to the dispatch application processor 136. When it receives the interrupt message, the dispatch application processor 136 can extract the relevant information from the interrupt message, such as the presence of the interrupt message and the reason why the message was generated. In response, the dispatch application processor 136 can reconstruct the interrupt message and can cause the base station 124 to transmit the interrupt message to, for example, the first mobile unit 128. The interrupt message can be transmitted to a mobile unit over the CCCH 168. For purposes of the invention, the term interrupt message and reconstructed interrupt message are essentially synonymous, and either term is applicable where suitable.

Figure 5:
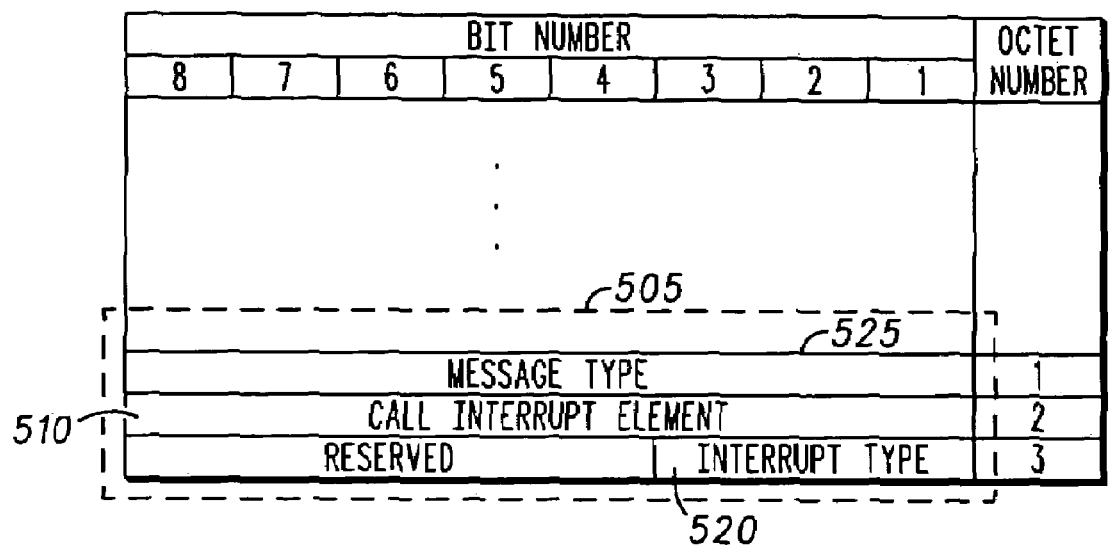
FIG. 5 illustrates a portion of a data packet in accordance with an embodiment of the inventive arrangements.

Any suitable protocol can be used to enable a communications network or another mobile unit to process the interrupt message. A portion of an exemplary data packet 500 that can be used for this purpose is illustrated in FIG. 5. The data packet 500 can be arranged to have, for example, eight bits and any suitable number of octects. As those of skill in the art will appreciate, while not shown in FIG. 5, the data packet 500 can include information that enables the system 100 and the first and second mobile units 128, 130 to facilitate communications between the first and second users 133, 135 (see FIG. 2).

To enable the process of interrupting the dispatch call, the data packet 500 can include an interrupt message 505 having a call interrupt element 510 and an interrupt type 520. The interrupt message 505 can also have a message type element 525. As an example and without limitation, the call interrupt element 510 can include eight bits, the interrupt type 520 can include three bits (the remaining bits can be reserved), and the message type element 525 can include eight bits, although other arrangements are possible for the invention.

The message type element 525 can inform a receiving system or mobile unit that a user of the mobile unit from which the data packet 500 was transmitted wishes to interrupt another user, i.e., wishes to gain control of the dispatch communications channel. In other words, the message type element 525 can inform the receiving system or the mobile unit of the presence of the interrupt message 505. The call interrupt element 510 can provide instructions to the receiving system or the mobile unit as to how to process the interrupt message 505. In addition, the interrupt type 520 can provide information to the receiving system or a mobile unit of an interrupt status, or a reason that gives an indication as to why the interrupting user wishes to interrupt.

In one arrangement, the call interrupt element 510, the interrupt type 520 and the message type element 525 can be backward compatible with systems or mobile units that do not support all the contents of the data packet 500. As an example, all or portions of the call interrupt element 510, the interrupt type 520 and the message type element 525 can be ignored by such systems or mobile units. It must be stressed that the data packet 500 is merely an example of a suitable protocol for causing a dispatch call to be interrupted. Those of skill in the art will appreciate that any other suitable protocol can be used to carry out such a process.

As mentioned earlier, the interrupt type 520 can be used to provide an interrupt status, or why the interrupt message 505 was generated. The following indicators are examples that can serve as an interrupt type 520: (1) the interrupting caller desires to have control over the first communications channel 162 (see FIG. 4); (2) the interrupting caller wishes to have the other caller call the interrupting caller at a later time; (3) the interrupting caller cannot currently speak; and (4) the interrupting caller is in a meeting or some other business or social function. Of course, it is understood that invention is not limited to the foregoing list, as other indicators can be used with the invention.

Referring back to the method 300 of FIG. 3, at step 316, the step of transmitting the interrupt message can be acknowledged. In addition, the first caller can be informed of the interrupt message through a user interface, as shown at step 318. The method 300 can end at step 320.

For example, referring back to FIGS. 2, 4 and 5, once it receives the interrupt message 505 from the second mobile unit 130, the dispatch application processor 136 can generate an acknowledgement. The dispatch application processor 136 can cause the base station 124 to transmit the acknowledgement over the CCCH 168 to the second mobile unit 130. In addition, when the base station 124 transmits the interrupt message 505 over the CCCH 168 to the first mobile unit 128, the transceiver 142 of the first mobile unit 128 can receive the interrupt message 505 and can forward it to the processor 144, which can process the interrupt message 505. The processor 144 can then instruct the user interface 146 to inform the first caller 133 of the interrupt message 505.

As an example, the processor 144 can instruct the display 148 of the first mobile unit 128 to display as a message or other form the presence of the interrupt message 505 and the reason for the interrupt message 505. As another example, the processor 144 can instruct the speaker 150 of the first mobile unit 128 to broadcast an audible tone. The audible tone can be broadcast in addition to or in lieu of the display of the interrupt message 505. Once informed, the first caller 133 can release the first communications channel 162 or take any other suitable action in response to the interrupt message 505. As an example, because the dispatch call is not terminated, the first caller 133 can release the first communications channel 162, and the second caller 135 can begin to speak.

The foregoing example was described in terms of a first caller, a second caller, a first mobile unit and a second mobile unit to assist the reader in understanding the invention. It must be noted, however, that the invention is not meant to be limited to this description in any way. That is, any caller involved in a dispatch call on any mobile unit can interrupt the dispatch call. Moreover, the party that initiated the call can interrupt the dispatch call; in other words, the party that received the call is not the only caller who can cause the interrupt message to be generated.

In addition, while the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for interrupting a dispatch call, comprising the steps of:
   in a simplex dispatch communications system having at least a first communications channel for carrying voice traffic and a second communications channel for carrying communications-enabling information, assigning the first communications channel to at least a first caller and a second caller to permit the first and second callers to engage in a dispatch call; and
   as the first caller has control over the first communications channel, transmitting an interrupt message over the second communications channel to inform the first caller of an interrupt status of the second caller, wherein the transmitting step is performed without terminating the dispatch call.

2. The method according to claim 1, further comprising the step of informing the first caller of the interrupt message through a user interface.

3. The method according to claim 2, wherein the user interface is a display or a speaker.

4. The method according to claim 1, wherein the interrupt status of the second caller is an indication that the second caller desires to have control over the first communications channel, that the second caller desires to have the first caller call the second caller at a later time, that the second caller cannot currently speak or that the second caller is in a meeting.

5. The method according to claim 1, wherein the first communications channel is a traffic channel and the second communications channel is a primary control channel having a random access channel or a common control channel.

6. The method according to claim 1, further comprising the step of acknowledging the step of transmitting the interrupt message.

7. A mobile unit for interrupting a dispatch call, comprising:
   a transceiver, wherein the transceiver is for use in a simplex dispatch communications system having at least a first communication channel for carrying voice traffic and a second communications channel for carrying communications enabling information, wherein the first communications channel is assigned to at least a first caller and a second caller to permit the first and second caller to engage in a dispatch call; and
   a processor, wherein as the first caller has control over the first communications channel, the processor is programmed to generate an interrupt message and to cause the transceiver to transmit the interrupt message over the second communications channel to inform the first caller of an interrupt status of the second caller without the dispatch call being terminated.

8. The mobile unit according to claim 7, wherein the interrupt status of the second caller is an indication that the second caller desires to have control over the first communications channel, that the second caller desires to have the first caller call the second caller at a later time, that the second caller cannot currently speak or that the second caller is in a meeting.

9. The mobile unit according to claim 7, wherein the first communications channel is a traffic channel and the second communications channel is a primary control channel having a random access channel or a common control channel.

10. A communications network for interrupting a dispatch call, comprising:
    a site for use in at least a simplex dispatch communications system, wherein the site has at least one base station for transmitting and receiving voice traffic over a first communications channel and for transmitting and receiving communications-enabling information over a second communications channel; and
    a communications processor, wherein the communications processor is programmed to assign the first communications channel to at least a first caller and a second caller to permit the first and second callers to engage in a dispatch call and as the first caller has control over the first communications channel, the communications processor is further programmed to generate an interrupt message and to cause the base station to transmit the interrupt message over the second communications channel to inform the first caller of an interrupt status of the second caller and wherein the interrupt message is transmitted without terminating the dispatch call.

11. The communications network according to claim 10, wherein the interrupt status of the second caller is an indication that the second caller desires to have control over the first communications channel, that the second caller desires to have the first caller call the second caller at a later time, that the second caller cannot currently speak or that the second caller is in a meeting.

12. The communications network according to claim 10, wherein the first communications channel is a traffic channel and the second communications channel is a primary control channel having a random access channel or a common control channel.

* * * * *